United States Patent
Marszalek et al.

[11] Patent Number: 5,970,853
[45] Date of Patent: Oct. 26, 1999

[54] FOOD COOKING ASSEMBLY, RESTAURANT SYSTEM, AND RESTAURANT METHODS

[75] Inventors: Andrzej Marszalek, Maspeth; Thomas W. Parker, Staten Island, both of N.Y.

[73] Assignee: Liberty Food Service Equipment, Inc., Long Island City, N.Y.

[21] Appl. No.: 09/078,498

[22] Filed: May 14, 1998

[51] Int. Cl.⁶ .................................................. A47J 37/12
[52] U.S. Cl. ............................. 99/403; 99/407; 99/410; 99/411
[58] Field of Search .............................. 99/403, 410, 411, 99/412, 413, 414, 407

[56] References Cited

U.S. PATENT DOCUMENTS

| | | | |
|---|---|---|---|
| 3,217,633 | 11/1965 | Anetsberger | 99/327 |
| 3,690,246 | 9/1972 | Guthrie, Sr. | 99/336 |
| 3,750,560 | 8/1973 | Holmes | 99/408 |
| 4,205,600 | 6/1980 | Garrett | 99/341 |
| 4,951,558 | 8/1990 | Figliuzzi | 99/336 |
| 5,142,968 | 9/1992 | Caron et al. | 99/404 |
| 5,301,604 | 4/1994 | Takahashi | 99/407 |
| 5,379,684 | 1/1995 | Ettridge | 99/336 |

OTHER PUBLICATIONS

Warner Electric Service & Installation Structions, P-264-1, Electrak 1 Series Electromechanical Linear Actuator, dated 1992 (15 pages, including back cover).

Pitco Frialator Brochure, "Basket Lifts, Over the top Design," dated Jan. 1996 (two pages).

Liberty Brochure, "Gas Deep Fat Fryer LF-GF30," dated 1995 (two pages).

*Primary Examiner*—David Lacey
*Assistant Examiner*—Drew Becker
*Attorney, Agent, or Firm*—Jerome D. Jackson

[57] ABSTRACT

A food cooking assembly, restaurant system and restaurant methods. The food cooking assembly and system act to lift food from a cooking medium, such as frying oil or boiling water. The assembly and system are reliable and easy to maintain. The system may be implemented with a retrofit to an existing cooking device.

24 Claims, 19 Drawing Sheets

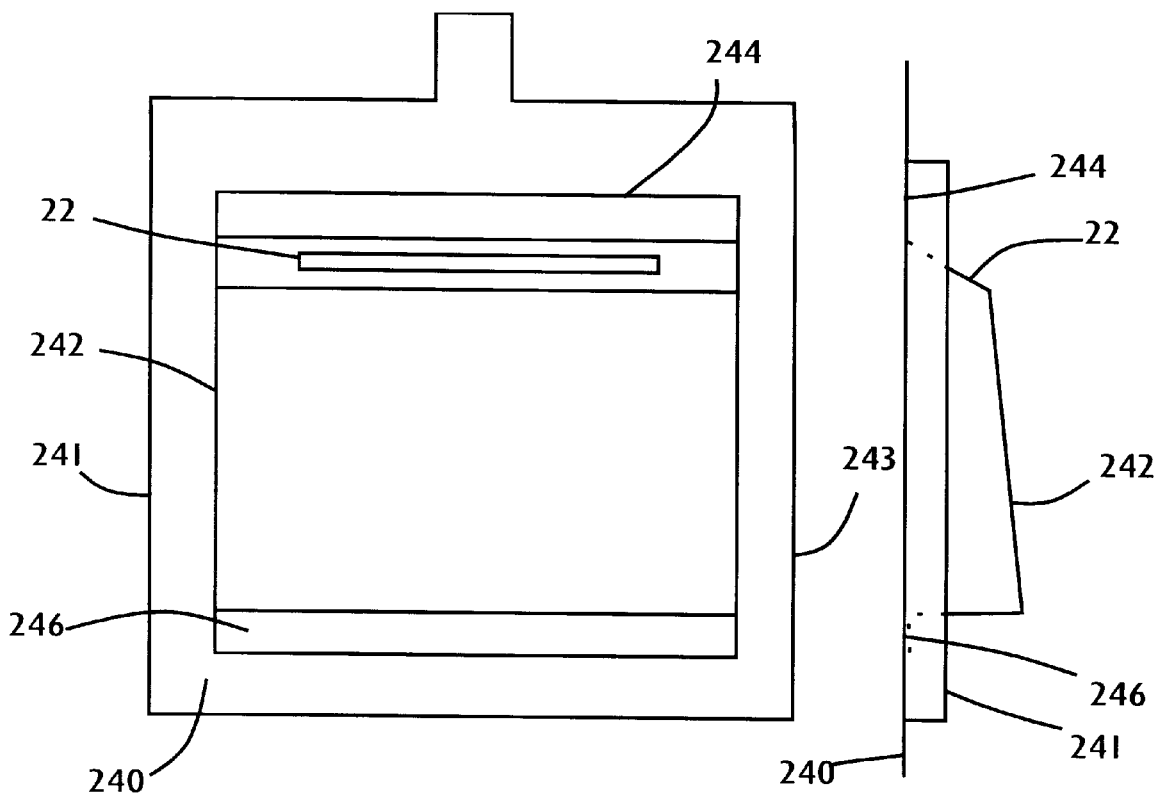
Fig. 9A  Fig. 9B

5,970,853

FOOD COOKING ASSEMBLY, RESTAURANT SYSTEM, AND RESTAURANT METHODS

BACKGROUND OF THE INVENTION

1. Field of the Invention

This invention relates generally to a food cooking assembly, restaurant system, and restaurant methods and, more particularly, to a system and method for lifting food out of a cooking medium, such as water or frying oil.

2. Description of Related Art

It is known to cook food with a cooking machine, such as a fryer, having a vessel containing a cooking medium, such as frying oil. It is usually desirable to lift the food from the medium at the termination of the cooking period. Various types of mechanized lifting systems have been proposed. Some systems impair access to the cooking vessel and food, making these systems unsuitable for certain environments, such as restaurants.

Other systems require a relatively complicated integration with the cooking machine.

Another system includes a small, open frame, fractional horsepower, gear motor with an eccentric cam secured to the output shaft. The motor is mounted on the bottom rear location of a restaurant type fryer. A cooking basket is connected to the motor, via a push rod assembly extending from the rear of the fryer. A problem with this system is limited load capacity. Another problem with this system is that it includes push rod guide bushings that tend to become soiled and misadjusted, causing friction, further reducing load capacity, and eventually damaging or destroying the motor.

SUMMARY OF THE INVENTION

It is an object of the present invention to provide a food cooking assembly, restaurant system, and restaurant methods that are relatively reliable and easy to maintain.

To achieve this and other objects of the present invention, a system for operating with a holder for a food portion, the holder and the food portion having a combined mass, the combined mass having a center of mass, the combined mass having a weight, comprises a housing including a vessel for holding a cooking medium; a threaded member supported by the housing and couplable to the holder, the threaded member defining a longitudinal axis, the longitudinal axis being horizontally aligned with the vessel, the longitudinal axis being horizontally displaced from the center of mass by at least 0.2 inches per pound of the combined mass; and a motor for changing the vertical position of the threaded member.

According to another aspect of the present invention, an assembly for a system including a housing with a vessel for holding a cooking medium, and a food holder for a food portion, the food holder and the food portion having a combined mass, the combined mass having a center of mass, the combined mass having a weight, comprises a threaded member defining a longitudinal axis; a motor for changing the vertical position of the threaded member; a housing coupler for coupling to the housing such that the longitudinal axis, of the threaded member, is horizontally aligned with the vessel; a holder coupler for coupling to the food holder such that the longitudinal axis, of the threaded member, is horizontally displaced from the center of mass by at least 0.2 inches per pound of the combined mass.

According to yet another aspect of the present invention, a system for a holder for a food portion, the holder and the food portion having a combined mass, the combined mass having a center of mass, comprises a housing including a vessel for holding a cooking medium; a lift member supported by the housing an engagable with the holder, the lift member defining a longitudinal axis, the longitudinal axis being horizontally aligned with the vessel, the longitudinal axis being displaced from the center of mass; and a motor for changing the vertical position of the lift member, wherein a weight of the combined mass produces a horizontal force, and the system further includes a mechanism for applying the horizontal force to the housing, such that no more than 50% of the horizontal force is applied to the lift member.

According to yet another aspect of the present invention, in a system including a food holder, and a housing with a cooking vessel for holding a cooking medium, a method comprises placing food in the food holder; lowering the food holder into the cooking medium; coupling a lift member to the food holder; subsequently, raising the lift member to lift the food holder from the cooking medium, by powering an electric motor located above the cooking vessel; and ejecting the food from the food holder, by manually moving the food holder.

According to yet another aspect of the present invention, a method for a system including a plurality of food holders, each holder for holding respective food portion having a combined mass, the combined mass having a center of mass, a housing with a vessel for holding a cooking medium, and a suspender for suspending a holder above the cooking medium, the suspender being coupled to the housing and vertically fixed, comprises removing the suspender from the housing; coupling a threaded member to the housing, such that a longitudinal axis of the threaded member is horizontally aligned with the vessel; and coupling a food holder support to the housing, via the threaded member, such that the longitudinal axis is displaced from the center of mass of a holder engaged to the support.

BRIEF DESCRIPTION OF THE DRAWINGS

FIGS. 9A and 9B show a part of the preferred assembly in more detail.

The accompanying drawings which are incorporated in and which constitute a part of this specification, illustrate embodiments of the invention and, together with the description, explain the principles of the invention, and additional advantages thereof. Throughout the drawings, corresponding parts are labeled with corresponding reference numbers.

DESCRIPTION OF THE PREFERRED EMBODIMENTS

Figure 1:
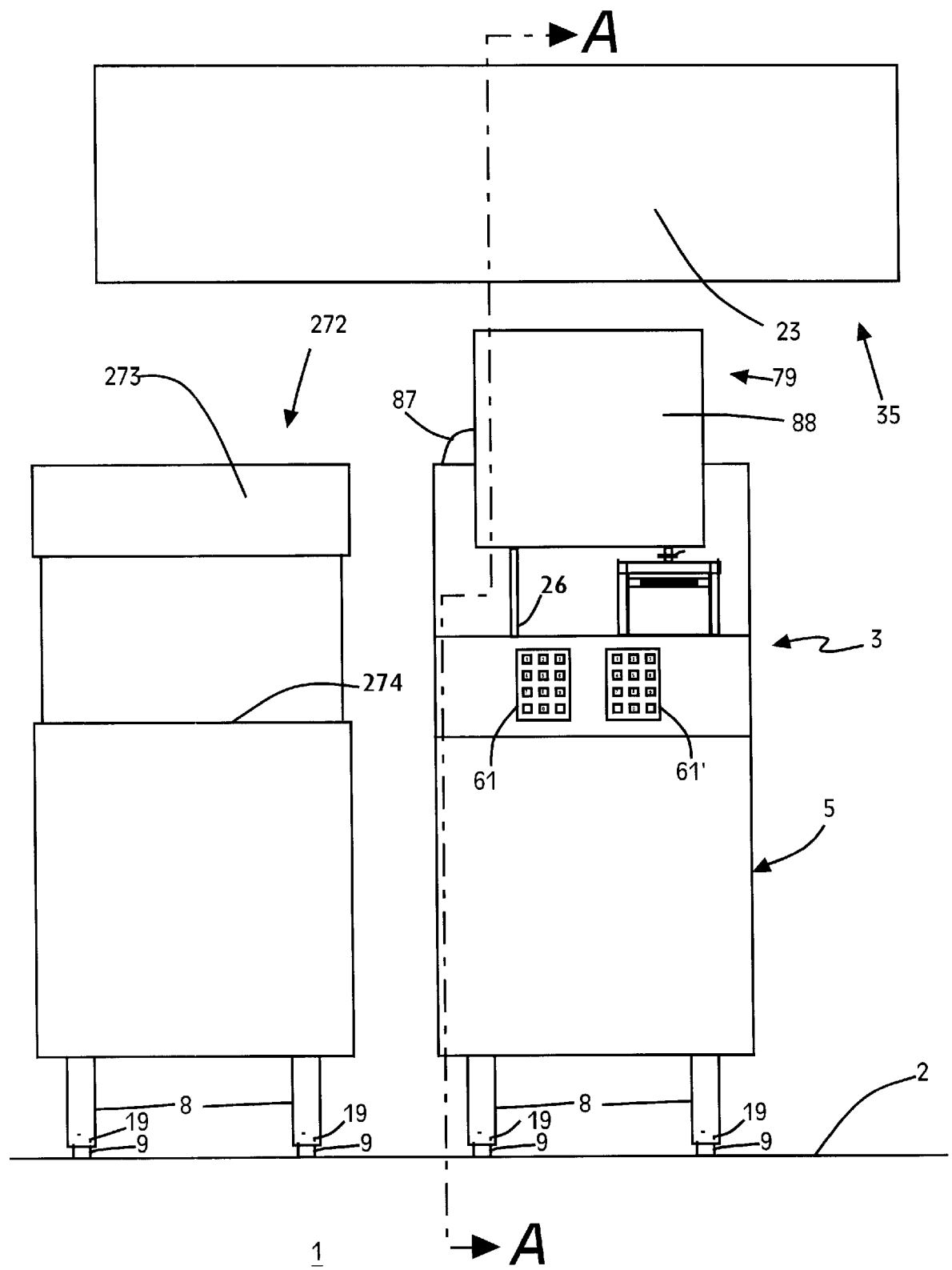
FIG. 1 is a front view of a restaurant system in accordance with a preferred embodiment of the present invention.
Figure 2:
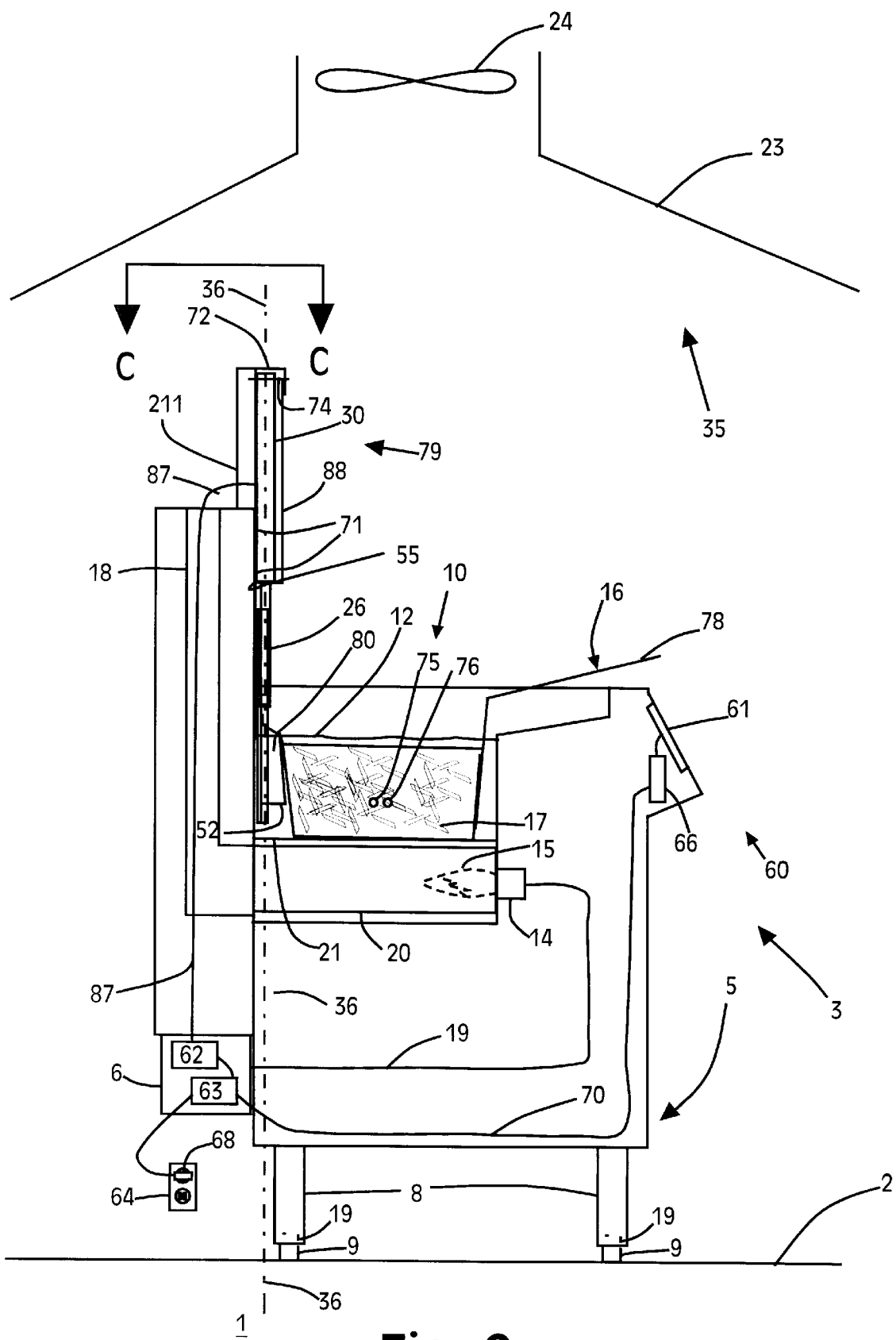
FIG. 2 is view taken along the line A—A in FIG. 1, partly is section an partly broken away.

FIG. 1 shows restaurant system 1 according to a preferred embodiment of the present invention, and FIG. 2 is a side view corresponding to the line A—A in FIG. 1. Restaurant system 1 includes fryer 3, restaurant floor 2, warming station 272, and exhaust system 35.

Fryer 3 includes main housing 5. Housing 5 includes cooking vessel 10 containing frying oil 12. Channel 50 acts to transfer certain forces to fryer housing 5 via mounting plate 71. Reinforcement plate 211 functions to provide support to mounting plate 71.

Housing 5 is supported by four adjustable legs 8. Each leg 8 is approximately 6 inches long. Each leg 8 includes a threaded extension member 9 for adjusting the length of the leg to accommodate slope or unevenness in restaurant floor 2.

Rear housing 6 encloses AC-DC converter 63 and relay circuitry 62. AC-DC converter 63 is plugged into 60 Hz wall socket 64 via plug 68. Converter 63 receives the 60 Hz power signal from socket 64.

Gas burner 14 receives gas from an external gas source (not shown) via gas line 19, to produce flames 15 in flame tube 20, to heat oil 12. Fryer 3 includes such several burners 14 and flame tubes 20.

Basket support 52 is in the down position such that the volume of basket 16, containing french fries 17, is beneath the surface of frying oil 12. Oil 12 thus cooks french fries 17 in metallic, wire cooking basket 16. During this cooking process, basket 16 rests on metallic screen 21.

Exhaust gases produced by flame 15 exit fryer 3 via fryer exhaust flue 18, and then exit restaurant system 1 via restaurant exhaust system 35. Exhaust system 35 includes exhaust hood 23 and fan 24 for drawing in the air above fryer 3 and pushing the air to the exterior of the restaurant building.

Timer module 60 includes timing electronics 66 and a left keypad 61. Left keypad 61 is essentially a manual interface that allows a restaurant worker to select a cooking time for french fries 17 in basket 16, in the left position in vessel 10. When the selected cooking time has elapsed, timing electronics 66 sends a left timer expiration signal to relay circuitry 62 in rear housing 6. Timing electronics 66 sends the left timer expiration signal via signal wire 92 (FIG. 5A) in conduit 70.

Conduit 70 is mounted on the interior of housing 5. Conduit 70 includes a metal jacket enclosed by a rubber jacket to protect the wires within from heat radiated from flame tube 20 and vessel 10. Conduit 70 is sealed between timing electronics 66 and rear housing 6, preventing insects, cooking oil, and other contaminants from entering conduit 70.

Figure 3:
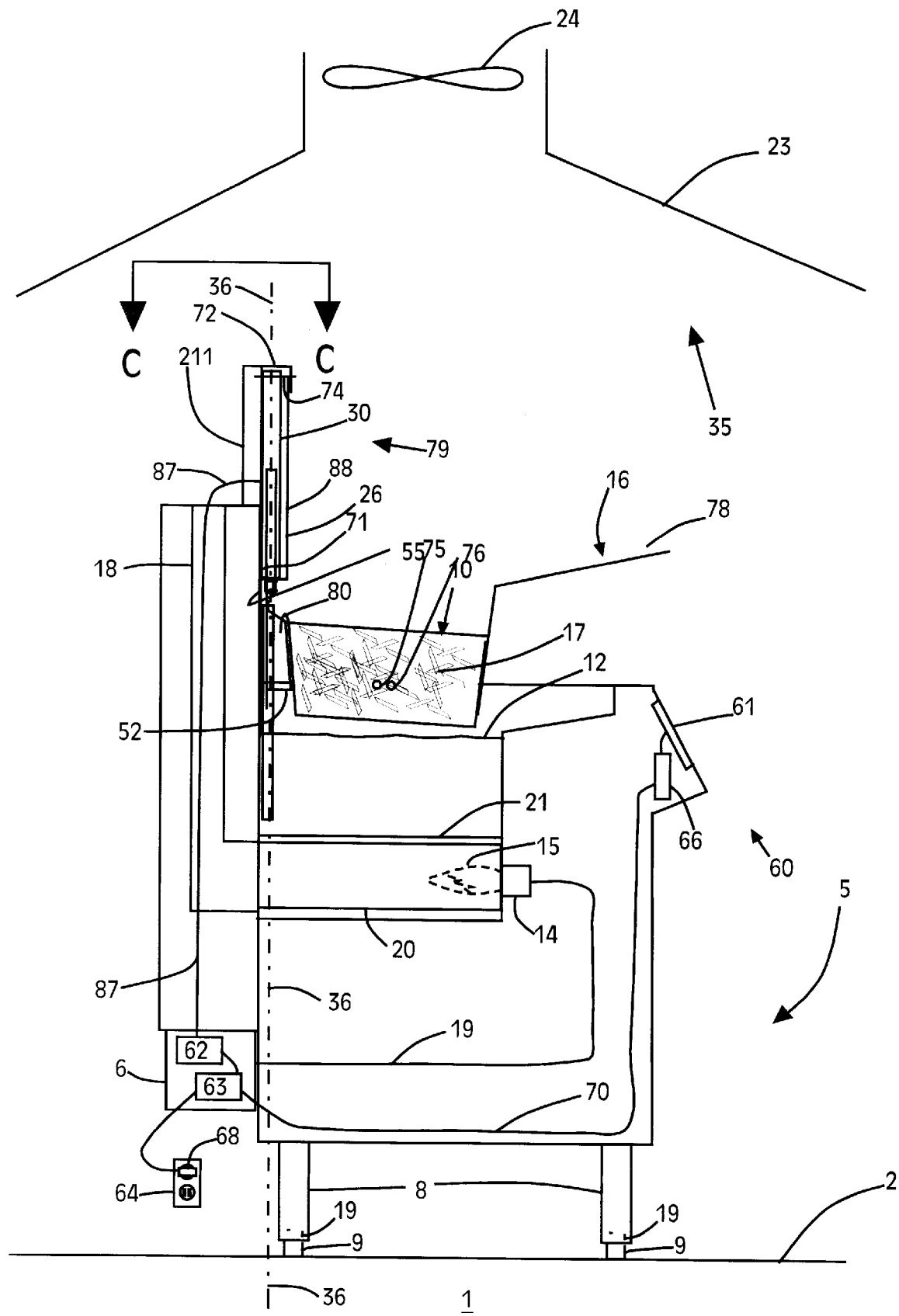
FIG. 3 is a view of the structure of FIG. 2 at a different point and time.

AC converter 63 converts the 60 Hz power signal, received from socket 64, to send DC power signals. Converter 63 sends a DC power signal to timing electronics 66 via a power wire in conduit 70. Converter 63 also sends a DC power signal to relay circuitry 62. Relay circuitry 62 conditionally sends the DC power signal to motor 237 of linear actuator 30, via signal wire 98 in conduit 87, when the left timer expiration signal is received from timing electronics 66. The DC power signal received by actuator 30 causes actuator 30 to retract, thereby lifting basket 16 out of oil 12 as shown in FIG. 3. Subsequently, a restaurant worker may eject french fries 17 from basket 16, by lifting basket 16 at basket handle 78, located opposite basket hook 80.

Timing electronic 66, conduit 70, relay circuitry 62, and conduit 87 are essentially a signal path supported by housing 5. This signal path is coupled between the keypad 61 and the motor 237.

Timer module 60 also includes timing electronics 66' and right keypad 61' that allows a restaurant worker to select a cooking time for food in a basket in the right position in vessel 10. When the right position cooking time has elapsed, timing electronics 66' sends a right timer expiration signal to relay circuitry 62. Timing electronics 66' sends the right timer expiration signal via signal wire 94 (FIG. 5A) in conduit 70.

Converter 63 sends a DC power signal to timing electronics 66' via a power wire in conduit 70. Converter 63 also sends a DC power signal to relay circuitry 62. Relay circuitry 62 conditionally sends the DC power signal to motor 237' of linear actuator 30', via signal wire 96 in conduit 87, when the right timer expiration signal is received from timing electronics 66. The DC Power signal received by actuator 30' causes actuator 30' to retract.

Warming station 272 includes bed 274 for holding cooked french fries, and electrically powered lamp 273 for radiating electromagnetic energy onto the cooked french fries, to keep the french fries warm between the time the fries are cooked and the time the fries are served. Warming station 272 also includes 4 adjustable legs 8 having the same structure as legs 8 of fryer 3, described above.

Figure 4:
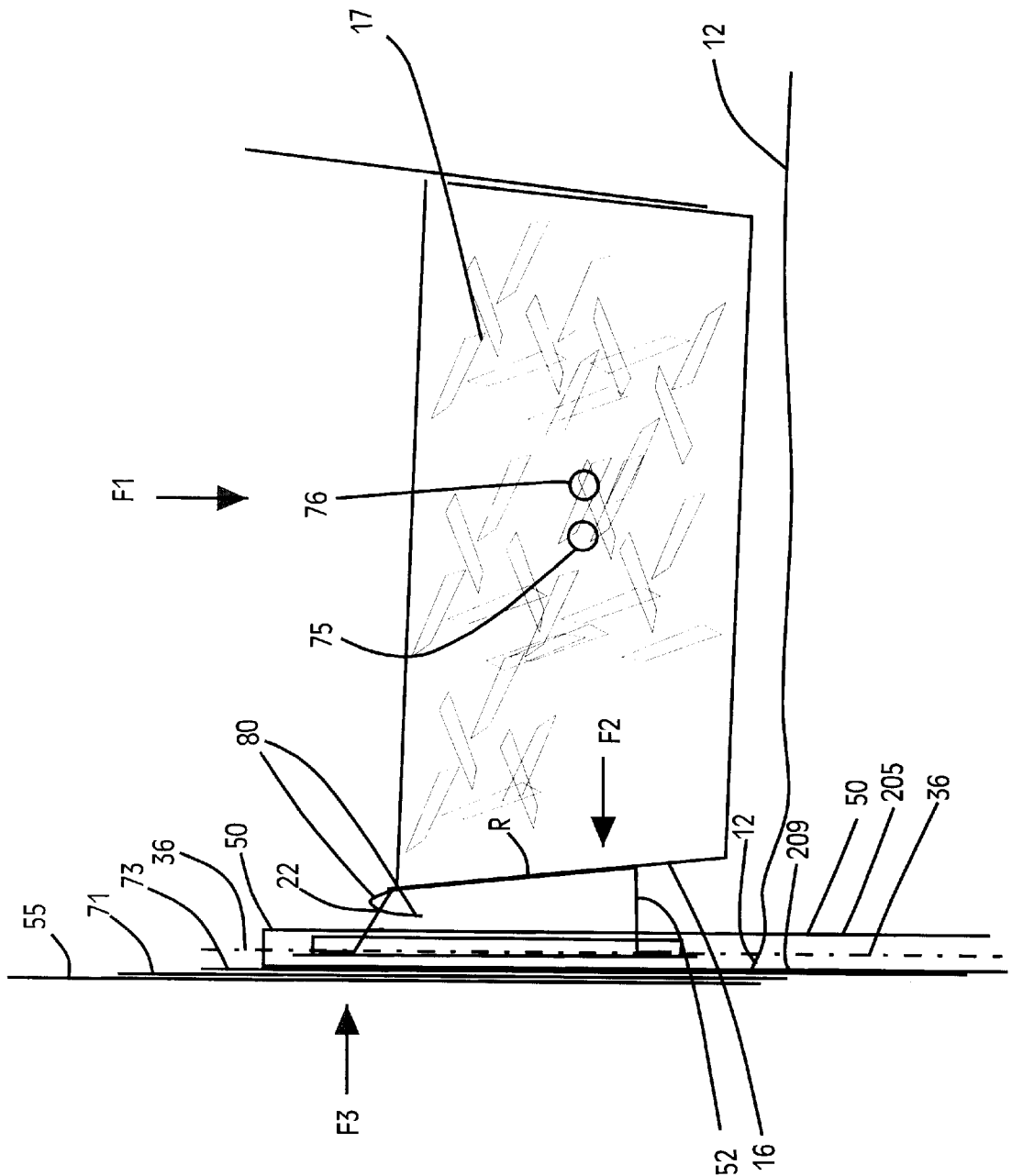
FIG. 4 is a view of the structure of FIG. 3 in more detail.

FIG. 4 shows a portion of the system of FIG. 3 in more detail, to describe some forces when the basket is in the up position shown in FIG. 3.

The load of basket 16 results from gravity times the combined mass of french fries 17 and basket 16 (the sum of the mass of french fries 17 and the mass of basket 16). This combined mass has a center of mass 76 that is horizontally displaced from longitudinal axis 36 of threaded cylinder 26. Longitudinal axis 36 is the stroke axis of actuator 30.

Basket 16 defines a center of volume 75 of basket 16's food holding part, which does not include handle 78. Center of volume 75 is not necessarily in the same location as the center of mass 76. Similar to center of mass 76, center of volume 75 is also offset from longitudinal axis 36 of threaded cylinder 26.

For the disclosed restaurant operation, it is presently preferred that the load of basket 16 be in the range 5–15 pounds. It is also presently preferred that the center of mass 76 be horizontally displaced from the longitudinal axis 36 by at least 3 inches. Larger loads are contemplated, however, wherein the longitudinal axis of the lift member is displaced from the center of mass of the load, by at least 0.2 inches per pound of load.

It is also presently preferred that the center of volume 75, of the food holding part of the basket, be horizontally displaced from the longitudinal axis 36 by at least three inches.

A lower part of channel 50 extends into oil 12 in vessel 10; lower parts of back surface 209, ceilings 205 and 207, and sides 206 and 208 extend into oil 12 in vat 10. Longitudinal axis 36 extends through channel 50 between back surface 209 and a plane defined by ceilings 205 and 207. Longitudinal axis 36 thus intersects oil 12 in vat 10.

When basket 16 is supported by actuator 30, instead of screen 21, basket support 52 is engaged with channel 50. For example, when threaded cylinder 26 goes between the extended and retracted positions, basket support 52 rides through channel 50. Channel 50 thus acts to compensate for forces resulting from the displaced location of the center of mass 76 relative to longitudinal axis 36.

More specifically, basket support 52 defines a slot 22 that engages a U-shaped basket hook 80 on basket 16, such that support 52 acts to support basket 16. The weight of basket 16 and food 17 exerts a vertical force F1. This vertical force F1 results in a torque having a rotation axis normal to the plane of the paper in FIG. 4 at a point R. This torque produces a horizontal force F2 that is non-parallel to longitudinal axis 36. Most of the force F2 is exerted against channel 50, via the bottom portion of basket support 52. Channel 50 acts to transfer most of F2 to fryer housing 5, via mounting plates 71 and 73. Because most of F2 is not exerted against actuator 30, actuator 30 may operate smoothly despite the horizontally displaced location the center of mass at point 76.

Figure 5A:
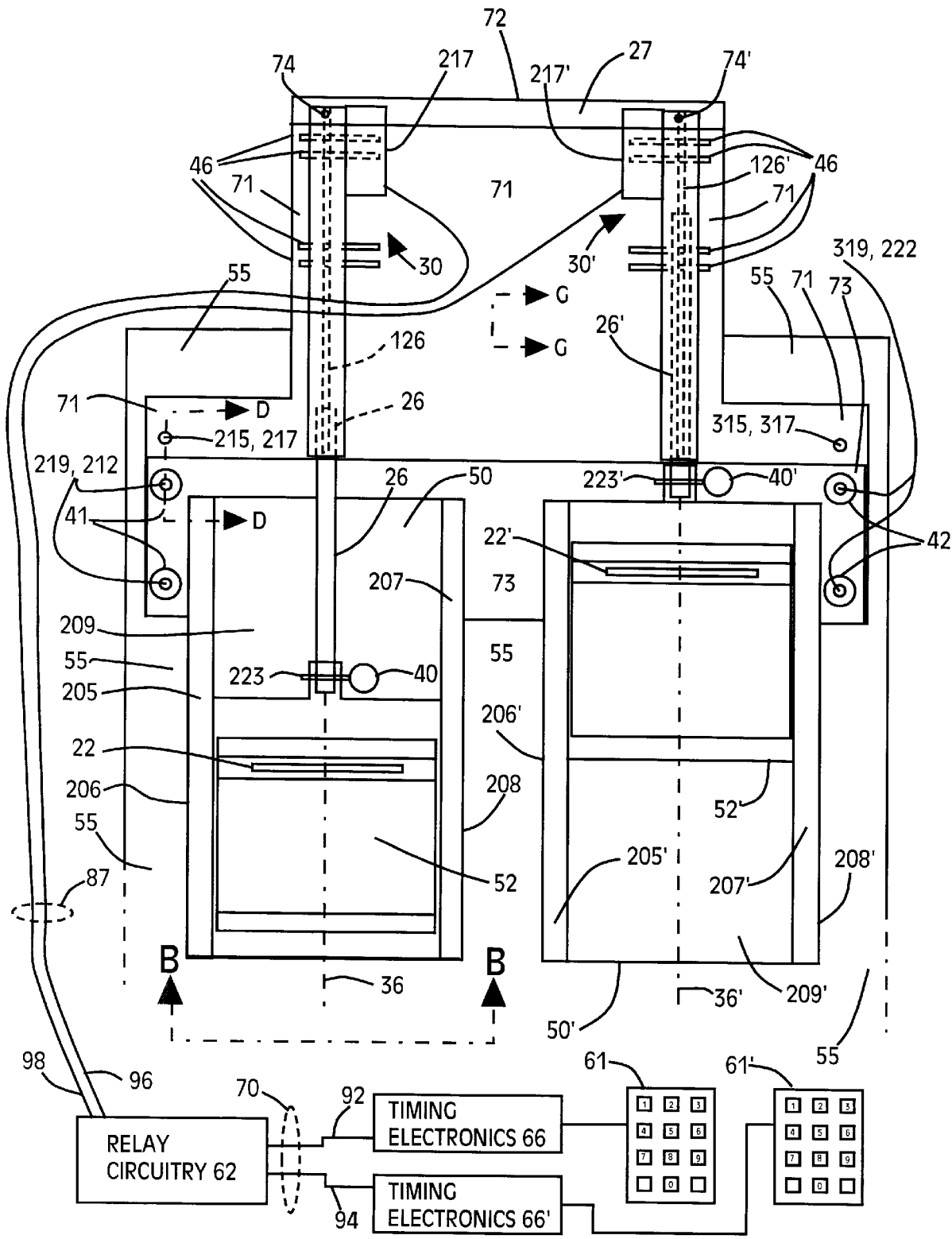
FIG. 5A is a front view emphasizing certain features of the preferred assembly.
Figure 5B:
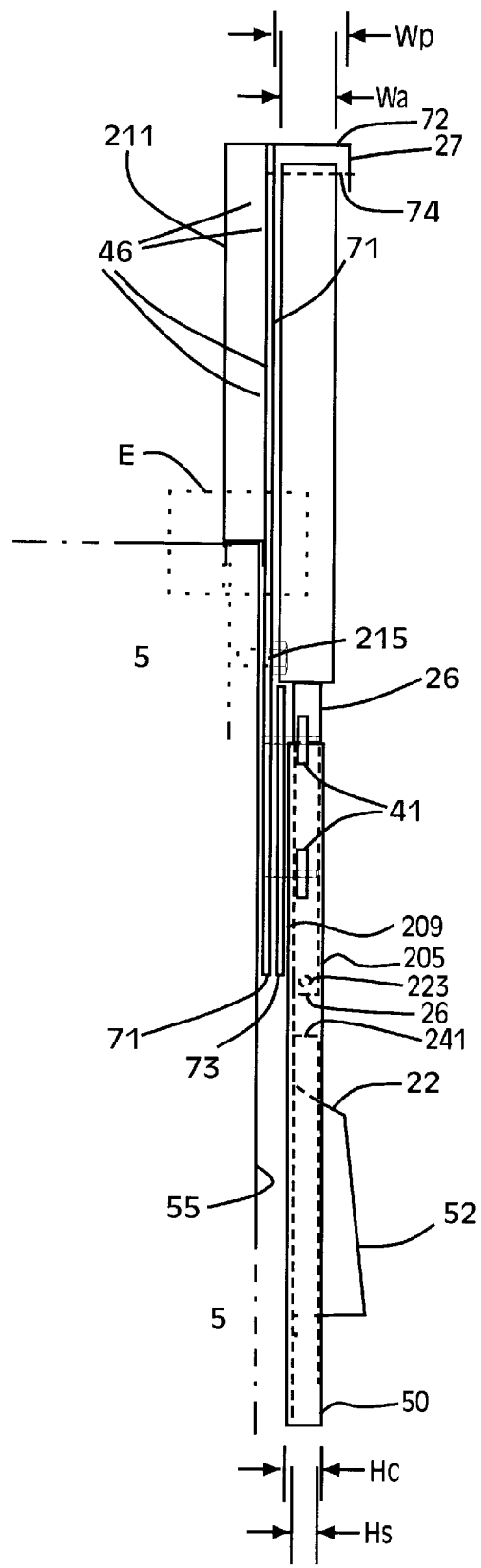
FIG. 5B is a side view corresponding to FIG. 5A.

FIG. 5A is a front view emphasizing the basket lifting mechanism assembly without cover 88, and FIG. 5B is a simplified side view corresponding to FIG. 5A. In FIGS. 5A and 5B, and throughout the drawings, some structures have been drawn out of scale in order to more clearly show certain features of the preferred embodiment.

Assembly mounting plate 71 defines bolt holes 215 and 315. Housing 5 defines vertical back wall 55, which defines bolt holes 217 and 317. Hole 215 can be concentrically arranged with hole 217 while hole 315 is concentrically arranged with hole 317, so that assembly mounting plate 71 is attachable to fryer wall 55 by engagement with bolt 224 through holes 215 and 217 (See FIG. 6) and engagement with another bolt through holes 315 and 317.

Figure 6:
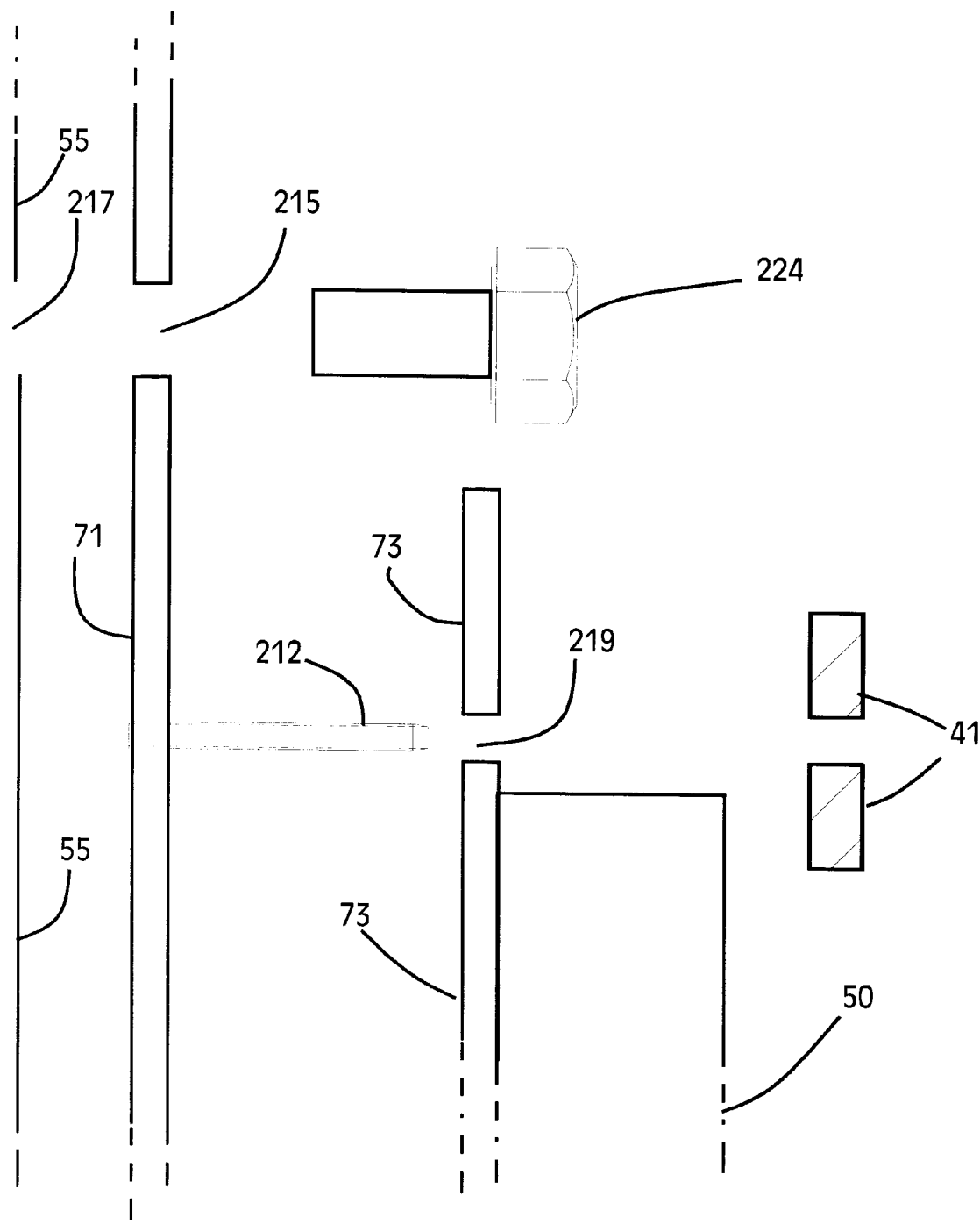
FIG. 6 is an enlarged, simplified view corresponding to part of FIGS. 5A and 5B.

FIGS. 6 is an enlarged, simplified view corresponding to the position of line D—D shown in FIG. 5A. FIG. 6 also includes a bolt 224 not shown in FIG. 5A and omits structure shown in FIG. 5A. Bolt 224 can extend through hole 215 in assembly mounting plate 71 and through hole 217 in wall 55.

Channel mounting plate 73 defines left holes 219 and right holes 319. Assembly mounting plate 71 includes threaded bolts 212, for attaching plate 73 to the left part of the plate 71, and threaded bolts 222, for attaching plate 73 to the right part of the plate 71. Each threaded bolt 212 is attached to assembly mounting plate 71 via welding. Each threaded bolt 222 is attached to assembly mounting plate 71 via welding. Holes 219 of plate 73 can be concentrically arranged with bolts 212 while holes 319 are concentrically arranged with bolts 222, so that channel mounting plate 73 is attachable to assembly mounting plate 71 by engagement with bolts 212 (See FIG. 6) and bolts 222.

Each threaded thumbscrew 41 is engagable with a respective threaded bolt 212. Similarly, each threaded thumbscrew 42 is engagable to a respective threaded bolt 222. Thus, channel mounting plate 73 is removably attached to assembly mounting plate 71 via thumb screws 41 and thumb screws 42.

Channels 50 and 50' are attached to channel mounting plate 73 via welding.

Horizontal beam 72 is at the top of plate 71. Bolts 74 and 74' extend through beam 72 in a direction normal to plate 71.

Actuators 30 hangs from bolts 74, such that the actuator 30 is vertically arranged. Threaded cylinder 26 defines a longitudinal axis 36 that intersects (is horizontally aligned with) frying oil 12 in vessel 10.

Actuator 30' hangs from bolt 74', such that actuator 30' is vertically arranged, and threaded cylinder 26' defines a longitudinal axis that intersects (is horizontally aligned with) frying oil 12 in vessel 10.

In the retracted position each of threaded members 26 and 26' is above vessel 10.

Basket support 52 is attached to threaded cylinder 26 by removable pin 223. Pin 223 is essentially a horizontal longitudinal member extending horizontally in a direction parallel to plate 71 and wall 55. Pin 223 is centered relative to channel 50, meaning that pin 223 has a horizontal position between a plane defined by back surface 209 and a plane defined by ceilings 205 and 207. Basket support 52 is rotatably attached to pin 223 and is thereby coupled to threaded cylinder 26. Because pin 223 allows rotation of basket support 52 about the axis of pin 223, basket support 52 may twist a limited amount. The amount of twist is limited by the relative dimensions of support 52 and channel 50. Thus, this limited twisting allows most of the torque, described above, to be transferred to housing 5 via channel 50, instead of actuator 30.

Referring to FIGS. 5B, 8, 9B, and 10, channel back surface 209 and left ceiling 205 define a channel height Hc, and back surface 209 and right ceiling 207 also define the channel height Hc. Left wall 241 of basket support 52 defines a height Hs, and right wall 243 also defines the height Hs. Hc is approximately 0.6 inches and Hs is approximately 0.47 inches, meaning that channel 50 limits horizontal motion of basket support 52 to no more than 0.13 inches.

Beam 72 defines beam front 27. Pin 74 extends through holes in beam 27 and plate 71. Plate 71 and beam front 27 define a width Wp. The part of actuator 30 between plate 71 and beam front 27 defines a width Wa. Wp is approximately 1.5 inches and Wa is approximately 1.0 inch, meaning that actuator 30 is slidingly engaged with pin 74 along a horizontal distance of 0.5 inches.

Because channel 50 limits horizontal motion of basket support 52 to be no more than 0.13 inches while actuator 30 may slide horizontally along pin 74 by at least 0.5 inches, most of the force F2 is applied to housing 5 via channel 50, without applying the most of the force to actuator 30. In the preferred embodiment, Applicants estimate the force applied to actuator 30 is less than 2% of F2. This less than 2% component is partially attributable to friction between actuator 30 and pin 74.

Further, because pin 74 extends through a hole in actuator 30 that is larger than pin 74, actuator 30 may have a small amount of horizontal swing, meaning that, although the horizontal motion of the top part of actuator 30 is limited to 0.5 inches, the horizontal motion of the bottom part of actuator 30 may be slightly more than 0.5 inches.

The relative dimensions and forces for right threaded cylinder 26', basket support 52', and channel 50' are the same as for left threaded cylinder 26, basket support 52, and channel 50, described above. Basket support 52' is attached to threaded cylinder 26' by removable pin 223', which extends horizontally in a direction parallel to plate 71. Channel back surface 209' and left ceiling 205' define the channel height Hc described above, and back surface 209' and right ceiling 207' also define the channel height Hc'. A left wall of basket support 52' defines the height Hs, and right wall also defines the height Hs, meaning that channel

50' limits horizontal motion of basket support 52' to no more than 0.13 inches.

Beam 72 defines beam front 27. Pin 74' extends through holes in beam 27 and plate 71. The part of actuator 30' between plate 71 and beam front 27 defines the width Wa. Because channel 50' limits horizontal motion of basket support 52' to be no more than 0.13 inches while actuator 30' may slide horizontally along pin 74' by at least 0.5 inches, most of the torque-induced, horizontal forces toward or away from wall 55 are applied to housing 5, without applying most of the force to actuator 30'.

Cover 88 (FIGS. 1 and 2) and assembly mounting plate 71 define an upper housing 79 enclosing actuators 30 and 130. Housing 79 defines openings (FIG. 12A) at the bottom, through which threaded members 26 and 26' may retract and extend. Cover 88 functions to protect actuators 30 and 30' from heated air rising out of vessel 10. Cover 88 also functions to protect actuators 30 and 30' from spatter from oil 12, and to hide actuators 30 and 30', giving the preferred system an esthetic appearance.

Figure 7:
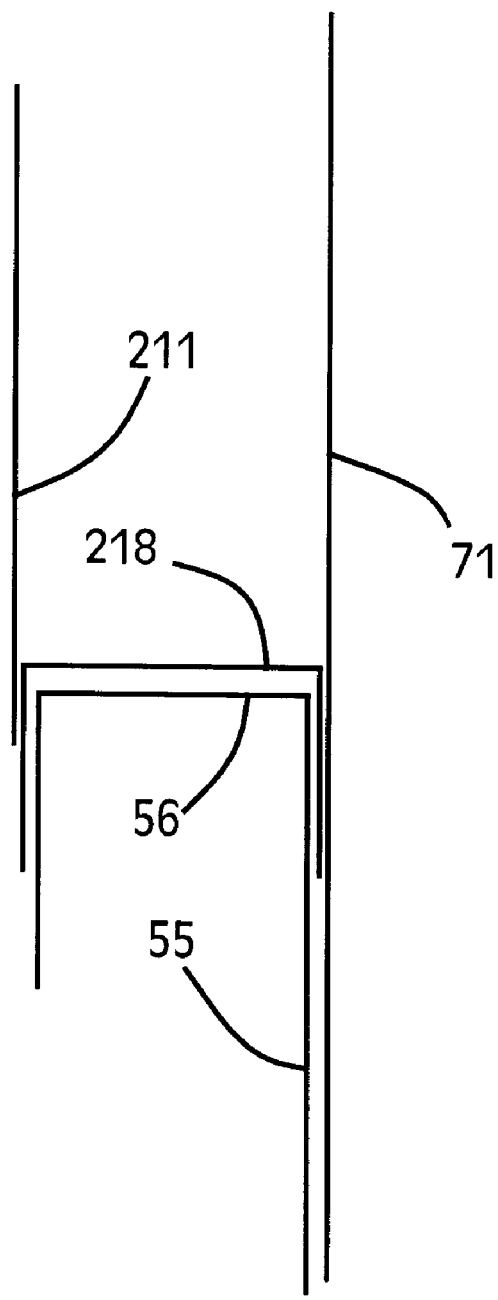
FIG. 7 is another enlarged simplified view corresponding to another part of FIGS. 5A and 5B.

FIG. 7 is an enlarged, simplified, diagram corresponding to line G—G in FIG. 5A and area E in FIG. 5B. Wall 55 defines an inner ledge 56 at the top of wall 55. The lifting assembly includes housing engagement member 218, which straddles ledge 56. Engagement member 218 is attached to both assembly mounting plate 71 and reinforcement plate 211 via welding.

Reinforcement plate 211 is arranged parallel to mounting plate 71. Reinforcement plate 211 extends up to beam 72. Reinforcement plate 211 functions to provide support to assembly mounting plate 71, especially that portion of assembly mounting plate 71 that extends above back wall 55 of fryer housing 5.

Assembly mounting plate 71 defines a plurality of ventilation slots 46 (FIGS. 5A and 5B). Ventilation slots 46 allow upper housing 79, defined by assembly mounting plate 71 and cover 88, to exchange air with the space between assembly mounting plate 71 and reinforcement plate 211, thereby cooling upper housing 79.

In summary, motor 237 is mechanically engaged with threaded cylinder 26. When motor 237 receives a DC power signal, motor 237 turns, causing threaded cylinder 26 to retract, lifting basket support 52, basket 16, and french fries 17, out of frying oil 12, thereby ceasing the cooking of french fries 17.

The function and structure of channel 50 and basket support 52 will now be described in more detail.

The torque produced by F1, described above, also results in a force F3, away from wall 55, at the top of basket support 52.

Figure 8:
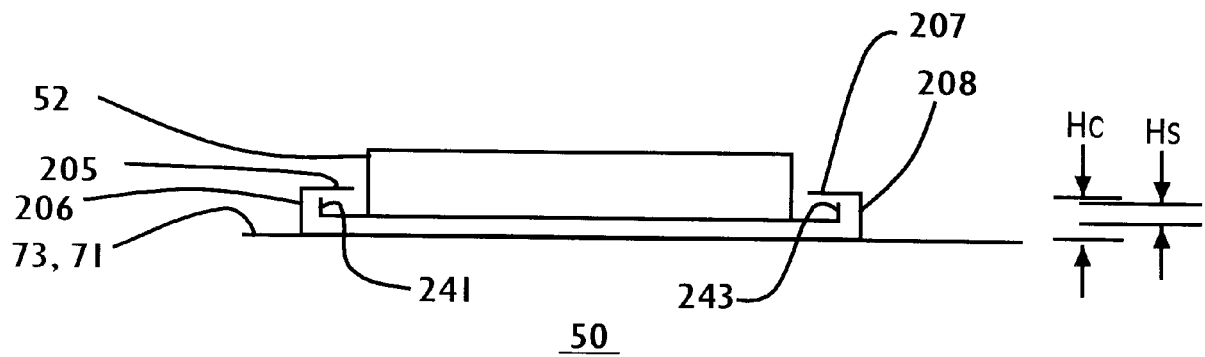
FIG. 8 is a view corresponding to the B—B in FIG. 5A.

FIG. 8 is a simplified bottom view corresponding to the line B—B in FIG. 5A. Channel 50 includes left ceiling 205 and right ceiling 207. The top portion of basket support 52 asserts most of the force F3 against ceilings 205 and 207. Because most of F3 is not asserted against actuator 30, actuator 30 may operate smoothly.

In summary, basket 16 and french fries 17 have a combined mass, the combined mass having a center of mass 76. Threaded cylinder 26 defining a longitudinal axis 36 that is horizontally aligned with oil 12 in vessel 10. Axis 36 is horizontally displaced from center of mass 76.

Because of gravity, the combined mass has a weight. The weight produces a horizontal force F2 toward wall 55, resulting from a torque produced by the off center loading of basket 16 and french fries 17. The weight also produces a horizontal force F3 away from wall 55, resulting from the torque.

Channel 52 is essentially a longitudinal member for applying the horizontal force F3 to housing 5 while applying less than 2% of the force F3 to threaded cylinder 26. Channel 52 is also a longitudinal member for applying the force F2 to housing 5, while applying less than 2% of the force F2 to threaded cylinder 26.

Channel 52 is essentially a longitudinal member including a plurality of first longitudinal members (ceilings 205 and 207) for applying the force F3 to housing 5 while applying less than 2% of F3 to threaded cylinder 26. Channel 50 also includes a second longitudinal member (back surface 209) for applying the force F2 to housing 5 while applying less than 2% of F2 to threaded cylinder 26.

Channel 50 also includes left channel wall 206 and right channel wall 208. Channel walls 206 and 208 act to limit side motion (motion parallel to wall 55), of support 52, thereby protecting actuator 30 from forces resulting from such side motion.

FIG. 9A is a front view showing basket support 52, and FIG. 9B is a side view corresponding to FIG. 5A. Basket support 52 includes guide member 240 and basket holder 242. Basket holder 242 defines a slot 22 that engages a U-shaped basket hook 80 (FIG. 4) opposite basket handle 78, such that support 52 acts to support basket 16.

Guide member 240 includes walls 241 and 243, each defining a height Hs. Walls 241 and 243 function to provide rigidity to guide member 240. Walls 241 to give basket support 52 a snug fit between the back surface of 209, of channel 50, and ceilings 205 and 207, of channel 50. This snug fit limits the emotion of basket support 52, thereby limiting the force applied by actuator 30 as describe above.

Basket holder 242 includes flat surfaces 244 and 246. Basket holder 242 is welded to guide member 240 via flat ceilings 244 and 246.

Basket support 52' is identical to basket support 52. Basket support 52' defines a slot 22' for engaging a basket hook.

Figure 10:
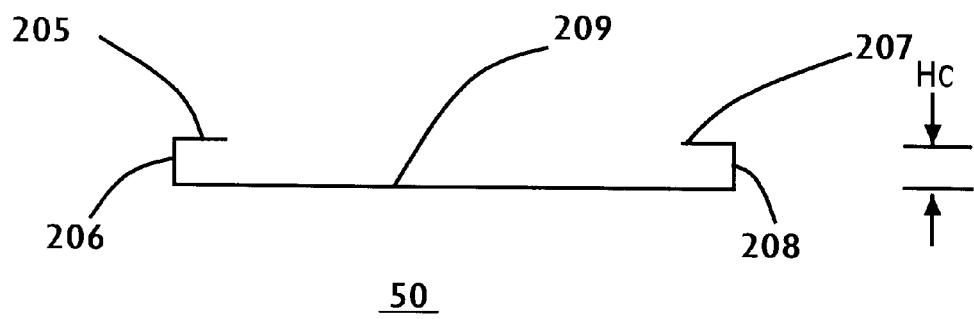
FIG. 10 shows another part of the preferred assembly.

FIG. 10 is a view showing channel 50 alone.

Figure 11:
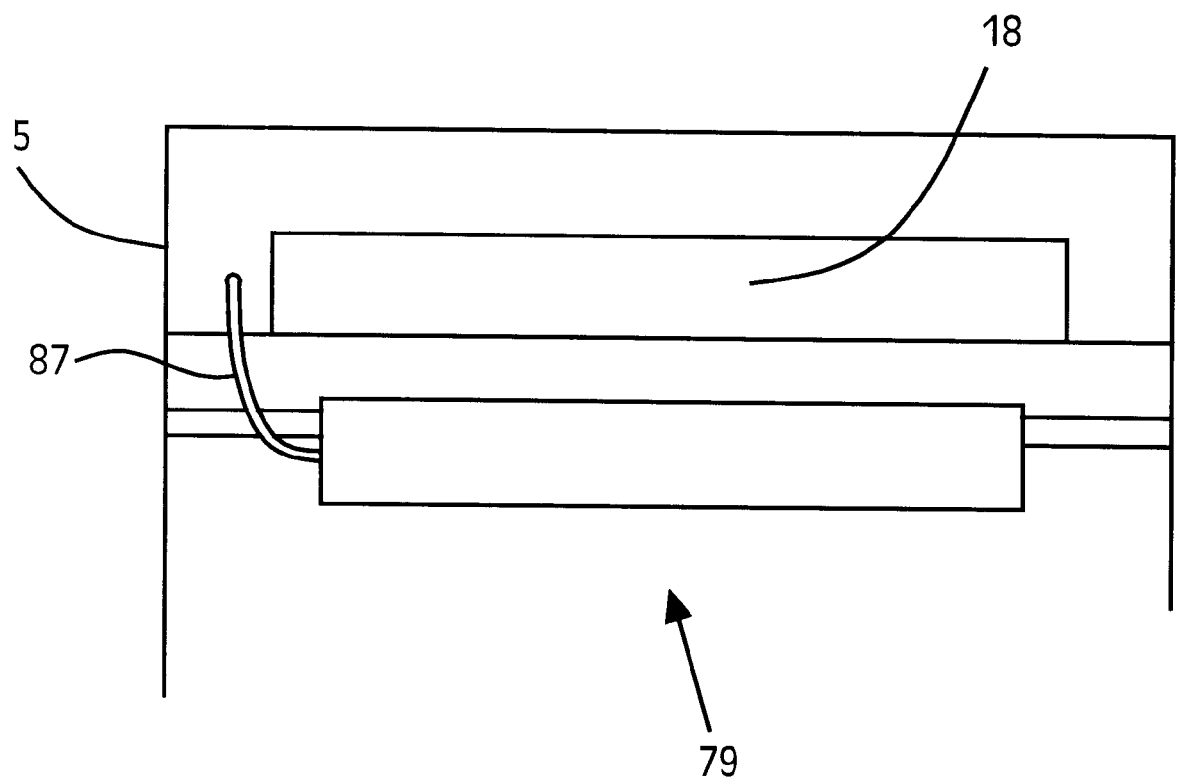
FIG. 11 is a simplified view taken along the line of C—C in FIG. 2.

FIG. 11 shows a view corresponding to line C—C in FIG. 2. Conduit 87 is coupled between auxiliary housing 6 and upper housing 79 along a space between exhaust flue 18 and the outer part of housing 5. Conduit 87, and the wires therein, are of a type to withstand elevated temperatures caused by gases within exhaust flue 18. Power wire 98 for carrying a first power signal, and power wire 96 for carrying a second power signal, are inside conduit 87 (FIG. 5A). Power wire 98 is coupled between relay circuitry 62 and motor 237, and power wire 96 is coupled between relay circuitry 62 and motor 237'.

An advantage of the location of conduit 87 is that conduit 87 does not contribute to the profile of fryer 3. Thus, conduit 87 does not prevent a fryer 3 from being located flush with a wall, and does not prevent multiple flyers 3 from being bolted together on the side.

Figure 12A:
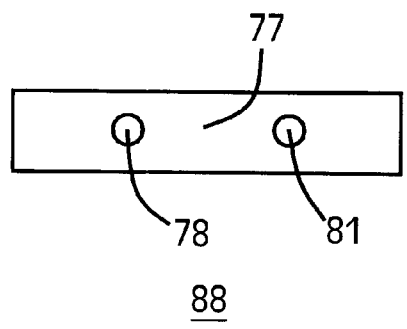
FIG. 12A shows yet another part of the preferred assembly in more detail.

FIG. 12A shows bottom portion 77 of cover 88. Bottom portion 77 defines an opening 78 through which threaded cylinder 26 may extend and retract, and defines an opening 81 through which threaded cylinder 26' may extend and retract.

Figure 12B:
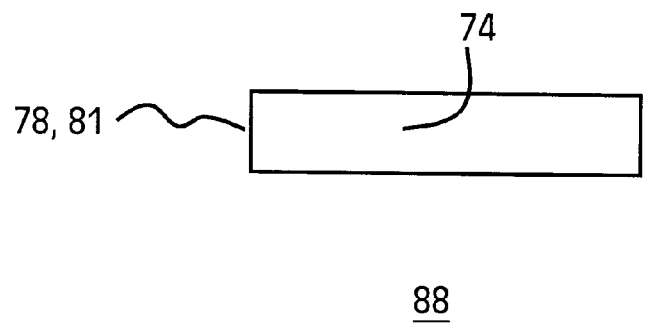
FIG. 12B is a view corresponding to FIG. 12A.

FIG. 12B shows a side portion 74 of cover 88.

In summary, restaurant 1 includes floor 2 and electrically powered fan 24, which acts as a blower for forcing air out of restaurant 1. Fryer 3 is a type of a cooking apparatus. Fryer 3 includes housing 5 with a vessel 10 for holding a cooking medium. Gas burner 14 functions as a heat source for heating oil 12. Housing 5 also includes exhaust flue 18, which acts as a type of channel for guiding exhaust gases produced by burner 14. Exhaust flue 18 is in fluid communication with fan 24.

Legs 8 support both housing 5 and motor 237. It is contemplated that legs 8 be adjustable around a nominal length of at least three inches, and it is presently preferred that legs 8 be adjustable around a nominal length of approximately six inches. Other types of supports are contemplated, such as wheel supports having an adjustable length.

Motor 237 is located at a level above vessel 10. Motor 237 is also over (in horizontal alignment with) vessel 10.

FIGS. 13A, 13B, 13C, 13D, and 13E are simplified top views corresponding to FIGS. 1, 2, and 3. Although, for clarity, FIGS. 13A, 13B, 13C, 13D, and 13E do not explicitly show certain features, FIGS. 13A, 13B, 13C, 13D, and 13E inherently show each feature of the preferred embodiment described above and in the drawings.

Figure 13B:
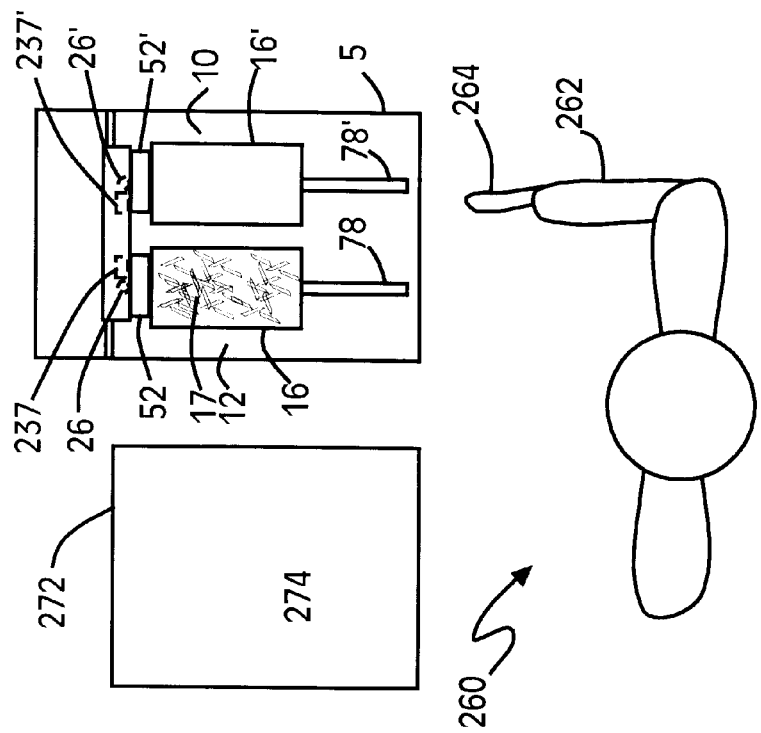
FIGS. 13A, 13B, 13C, 13D, and 13E are highly simplified top views for describing a preferred method.
Figure 13A:
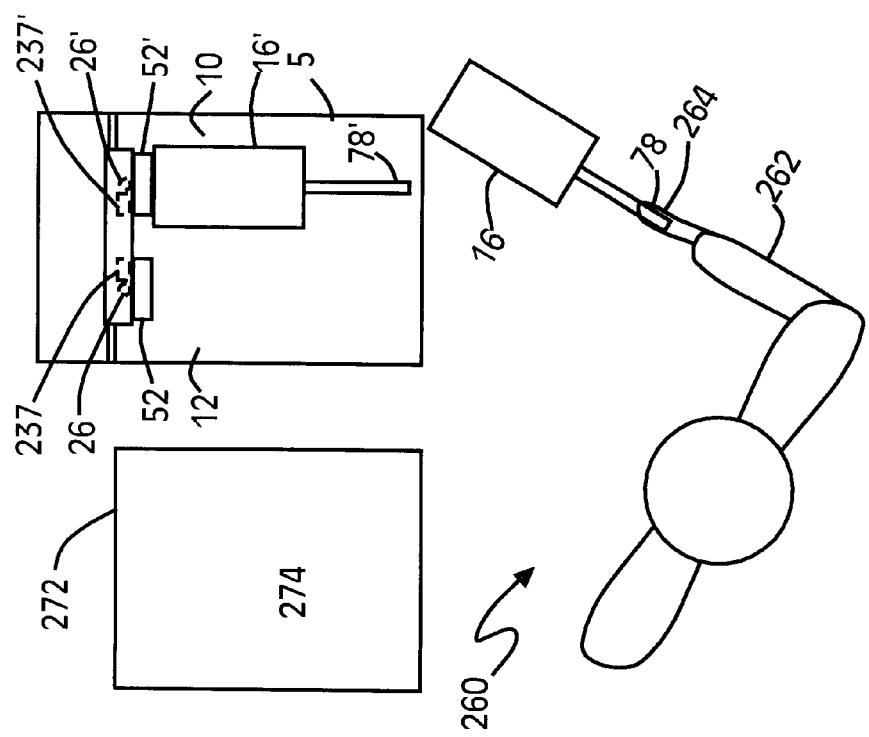

FIGS. 13A, 13B, 13C, 13D, and 13E show a preferred method for cooking food, including manual steps performed by restaurant worker 260 having arm 262 and hand 264. As shown in FIGS. 13A–13B worker 260 places french fries 17 into basket 16, while basket 16 is above oil 12, and engages basket 16 with basket support 52, by grabbing basket handle 78 with hand 264. Because basket 16 is engaged with a basket support 52, basket 16 is coupled to threaded cylinder 26 and motor 237.

Worker 260 selects a cooking time for french fries 17, by using hand 264 to enter the cooking time on keypad 61.

Figure 13D:
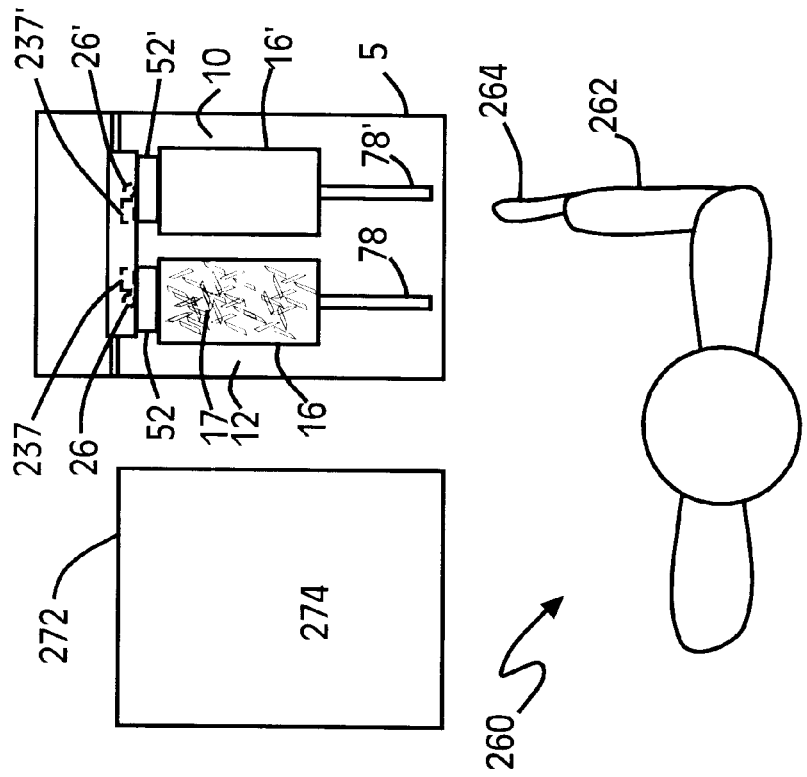
Figure 13C:
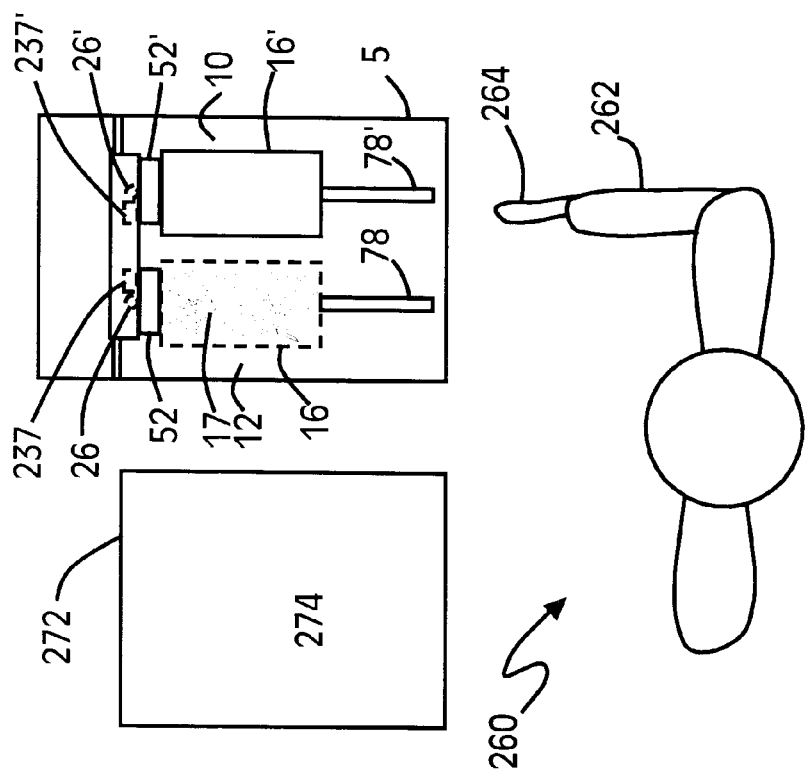

As shown in FIG. 13C, worker 260 causes the system to lower basket 16 so that french fries 17 are below the surface of frying oil 12, as represented by the food holding part of basket 16 being shown in dotted outline. Worker 260 lowers basket 16 by using hand 264 to press a key on keypad 61 (FIG. 1), thereby causing threaded cylinder 26 to extend to a lower position.

Subsequently, timing electronics 66 sends a timer expiration signal to relay circuitry 62.

Relay circuitry 62 receives the timer expiration signal and, in response, sends a power signal to motor 237, via power wire 98. Motor 237 receives the power signal and, in response, turns to retracting threaded cylinder 26 into a raised position, to lift french fries 17 above the level of frying oil 12, as shown in FIG. 13D. (See Also FIG. 3).

Figure 13E:
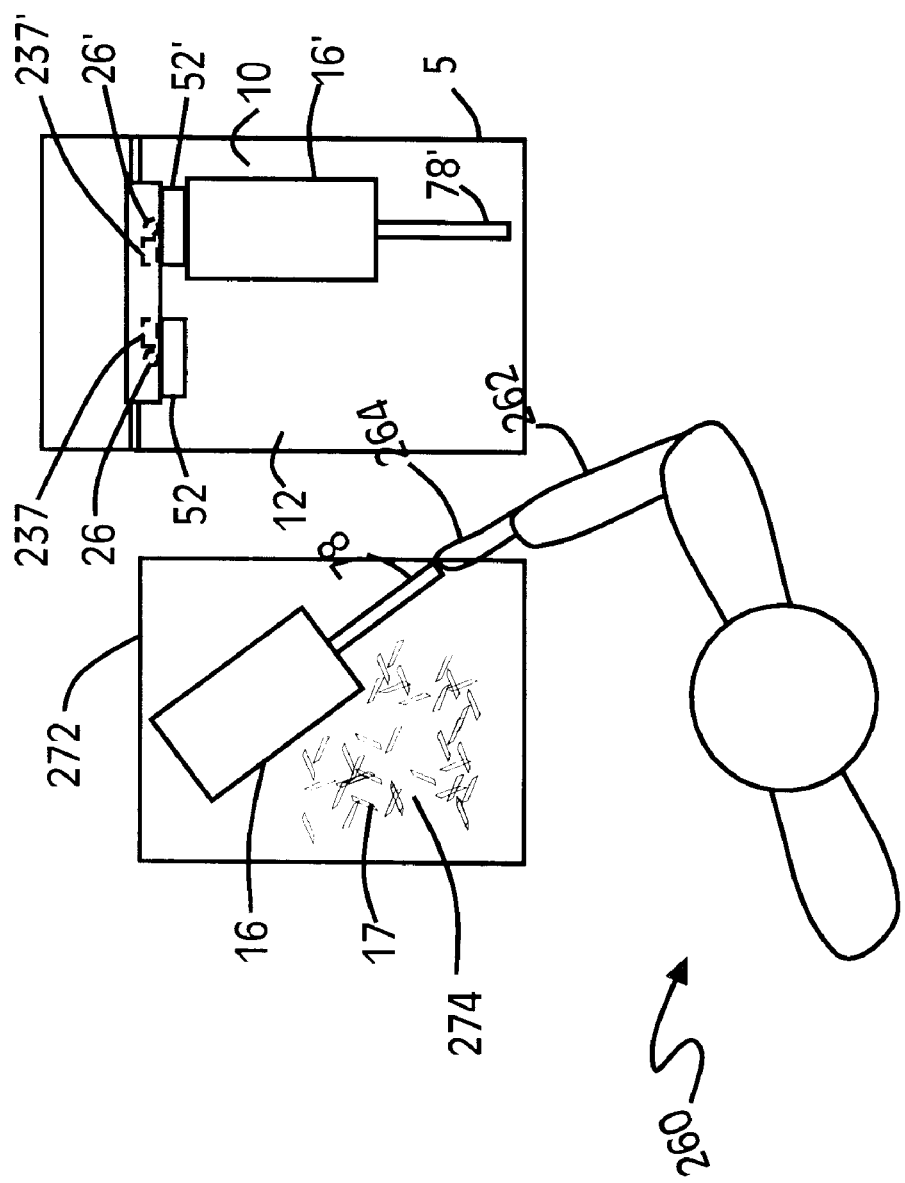

As shown in FIG. 13E, worker 260 ejects french fries 17 from basket 16, onto warming station 272. Worker 260 ejects french fries 17 by grabbing handle 78 with hand 264 to disengage basket 16 from basket support 52, moves basket 16 laterally and inverts basket 16 over warming station 272. By this process, worker 260 spreads out french fries 17.

During the process shown in FIGS. 13A, 13B, 13C, 13D, and 13E, basket 16' remained above the surface of oil 12.

After the steps shown in FIG. 13E, a worker 260 repeats steps 13A, 13B, 13C, 13D, and 13E with a basket and basket support 52, or with a basket and basket support 52'. Each time motor 237, or motor 237', raises a basket above the level of frying oil 12, a worker 260 manually disengages the basket from basket support 52, or support 52', to manually eject cooked french fries. This process is repeated over the course of a plurality of months.

In other words, restaurant 1 also includes a plurality of metallic wire cooking baskets 16. Each cooking basket 16 is a standard type of device for holding food in oil 12. Each basket 16 is of a type commonly used with a variety of conventional fryers and conventional basket suspending structures. Baskets 16 are mechanically couplable to motor 237, via basket support 52, pin 223, threaded cylinder 26 (a longitudinal lifting member) and screw 126. Motor 237 thus acts to lift french fries 17 out of oil 12.

Further, worker 260 may practice the method described above concurrently and asynchronously, with both basket support 52 and basket support 52'. The method may by practiced asynchronously and concurrently, because keypad 61 and timing electronics 66 are configured for controlling the raising of basket support 52; and keypad 61' and timing electronics 66' are configured for controlling the raising of basket support 52'.

For washing, basket supports 52 and 52', and channels 50 and 50', may be removed without tools. First, a service worker removes pin 223, which attaches basket support 52 to actuator 30, by pulling on ring 40; and removes pin 223', which attaches basket support 52' to actuator 30', by pulling on ring 40'. Next, the worker counter-clockwise rotates left thumbscrews 41 and right thumbscrews 42 allowing channel mounting plate 73 to separate from assembly mounting plate 71. With channel mounting plate 73, and therefore channels 50 and 50', clear of fryer 3, basket support 52 may slide out of channel 50, and basket support 52' may slide out of channel 50'. Thus, channels 50 and 50', and basket supports 52 and 52', may be easily washed in a dishwasher, for example.

Although in the method described above, a basket first becomes engaged with threaded cylinder 26 while the basket is above frying oil 12, the method can be practiced by first engaging the basket with the threaded member when the basket is below the surface of frying oil 12.

Although the preferred systems show a total of four thumbscrews for removably attaching the channels 50 to the fryer housing 5, it is contemplating that a different number of thumbscrews could be used. For example, it is contemplated that the pair of left thumbscrews 41 could be replaced by a single left thumbscrew located approximately midway between the two left thumbscrews 41. Similarly, the pair of right thumbscrews 42 could be replaced by a single right thumbscrew located approximately midway between the two right thumbscrews.

Figure 14A:
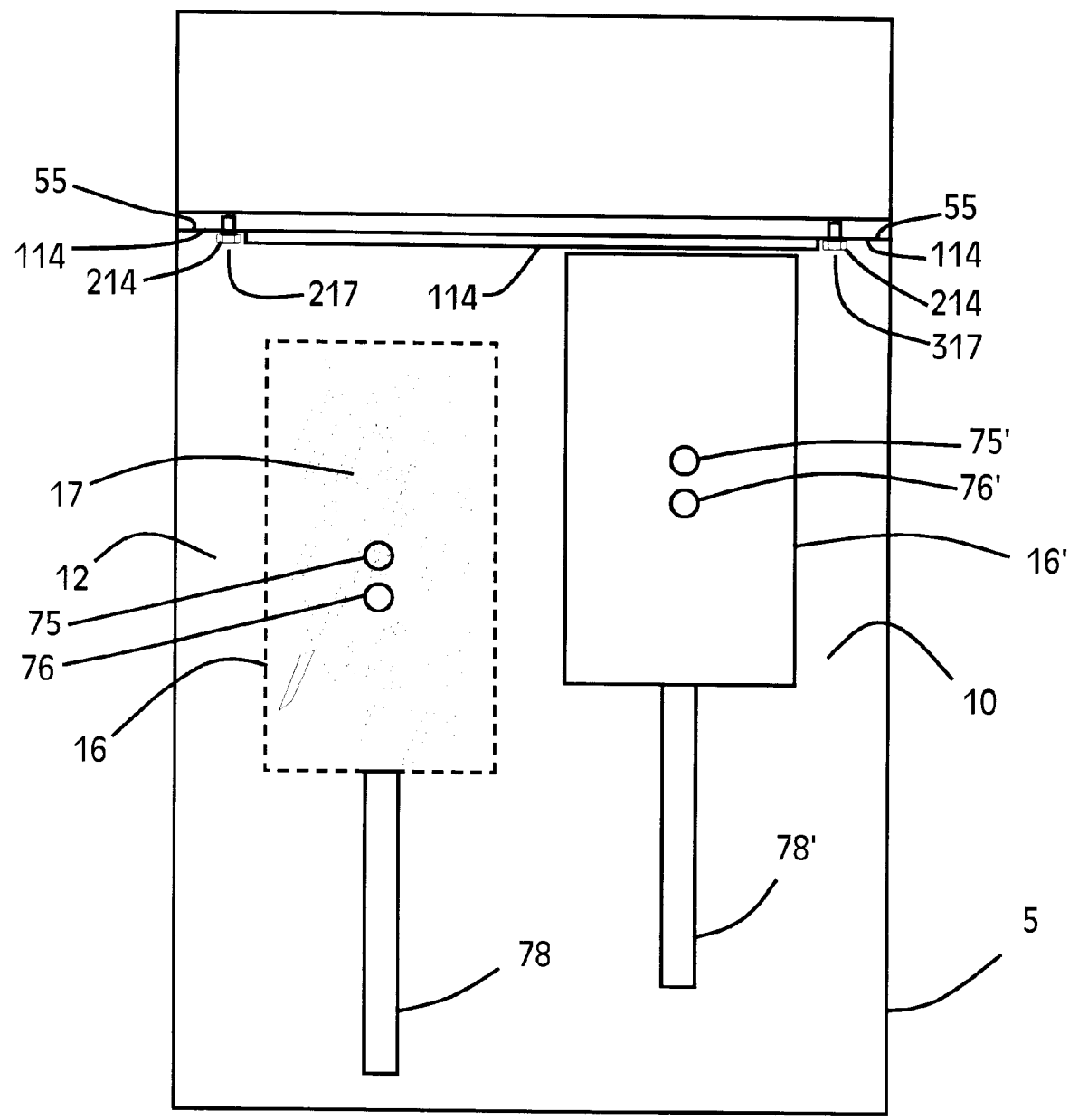
FIGS. 14A, 14B, and 14C are highly simplified top views for describing another preferred method.

FIG. 14A shows a fryer including fryer housing 5 having vessel 10, which holds frying oil 12. Basket suspender 114 has a structure, such as a slot or hook, for holding cooking baskets above oil 12. In FIG. 14A, basket 16' is engaged with basket suspender 114 so that basket 16' is above frying oil 12. In contrast, basket 16 is not engaged with suspender 114 and is below oil 12, so that french fries 17 in basket 16 are in the process of cooking.

Suspender 114 is attached to fryer wall 55 by engagement of bolts 214 through holes 217 and 317 of wall 55.

The fryer of FIG. 14A may be operated by manually lifting basket 16 or basket 16' onto suspender 114 at the termination of a cooking cycle. Alternatively, although suspender 114 may be present, instead of using suspender 114 a mechanized lifting mechanism, such a one having a bottom rear mounted motor described in the description of related art above, may be employed. After using the system of FIG. 14A, one may convert the system of FIG. 14A into the preferred system of cooking food described above. Such a conversion would be desirable if, for example, the system of FIG. 14A were being used manually and it is desired to automate the basket lifting process. As another example, such a conversion would be desirable if the system of FIG. 14A were being used with a mechanized basket lifting mechanism that had worn out, a process that would typically take at least several months or more.

Figure 14B:
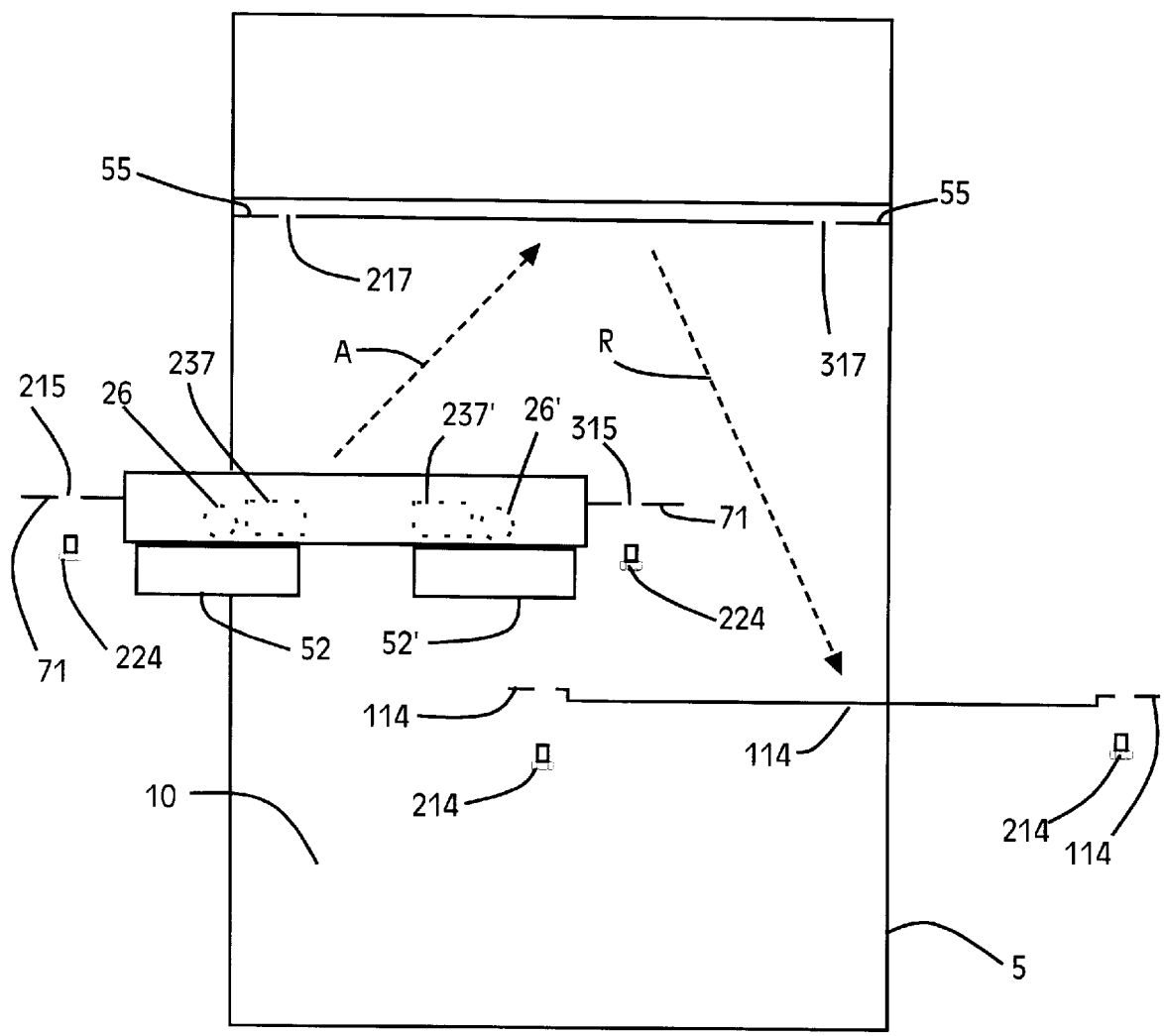
Figure 14C:
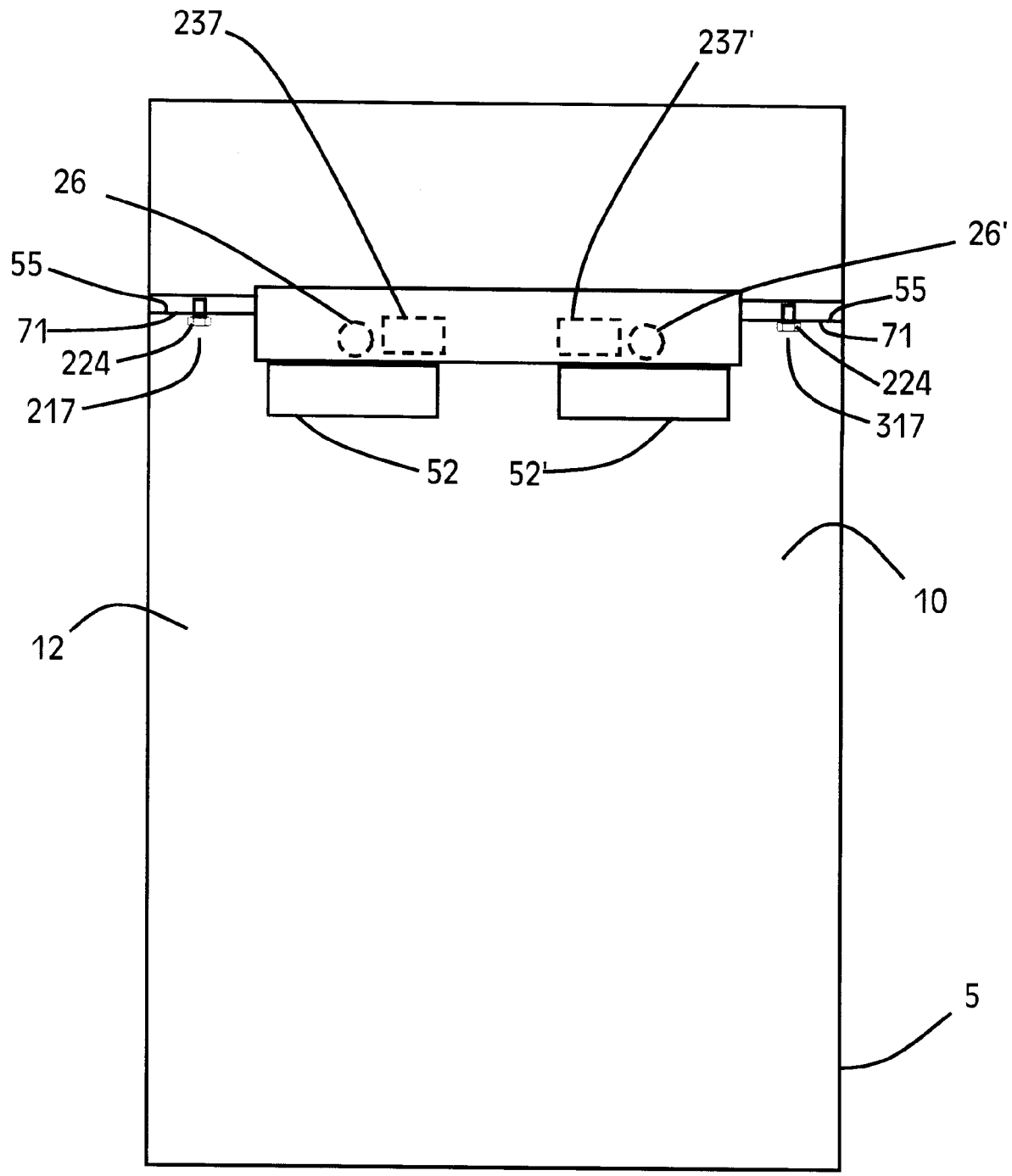

FIG. 14B represents the process of converting the configuration of FIG. 14A into the preferred cooking system described above in connection with FIGS. 1–12. First, a technician removes basket suspender 114, by disengaging suspender 114 from holes 217 and 317, a process represented by the arrow labeled R in FIG. 14B. Next, a technician attaches the preferred basket lifting assembly to fryer wall 55 by engaging mounting plate 71 to fryer wall 55 via holes 217 and 317, a process represented by the arrow labeled A in FIG. 14B. After connection of motor power signals to motors 237 and 237', and any needed addition of a manual interface and timing circuitry, the result of the conversion process is shown in FIG. 14C. FIG. 14C is identical to the preferred fryer 3 described in connection with FIGS. 1–12 above. After the conversion, one may operate the fryer of FIG. 14C in accordance with the method described in connection with FIGS. 13A, 13B, 13C, 13D, and 13E described above.

In accordance with the forgoing description, the location of bolt holes 215 and 315 of assembly mounting plate 71, and their spacing relative to each other, will vary depending on the particular model of cooking apparatus to be retrofitted.

In other words, housing 5 defines a plurality of holes (holes 217 and 317). Suspender 114 is for suspending a basket at a fixed elevation above the cooking medium (frying oil 12). Suspender 114 is coupled to housing 5, by engagement through holes 217 and 317, such that suspender 114 is vertically fixed. A preferred method includes cooking food in the vessel and subsequently, after a plurality of months, removing suspender 114 from housing 5. Next, one couples threaded cylinder 26 to housing 5, by engagement of plate 71 through holes 217 and 317, such that a longitudinal axis of the threaded cylinder 26 is horizontally aligned with vessel 10. In other words, suspender 114 is coupled to housing 5 using a certain support structure (holes 217 and 317). One couples threaded cylinder 26 to housing 5 using this support structure (holes 217 and 317). One also couples holder support 52 to housing 5, via the threaded cylinder 26, such that longitudinal axis 36 of threaded cylinder 26 is displaced from the center of mass corresponding to a basket engaged to support 52.

Figure 15:
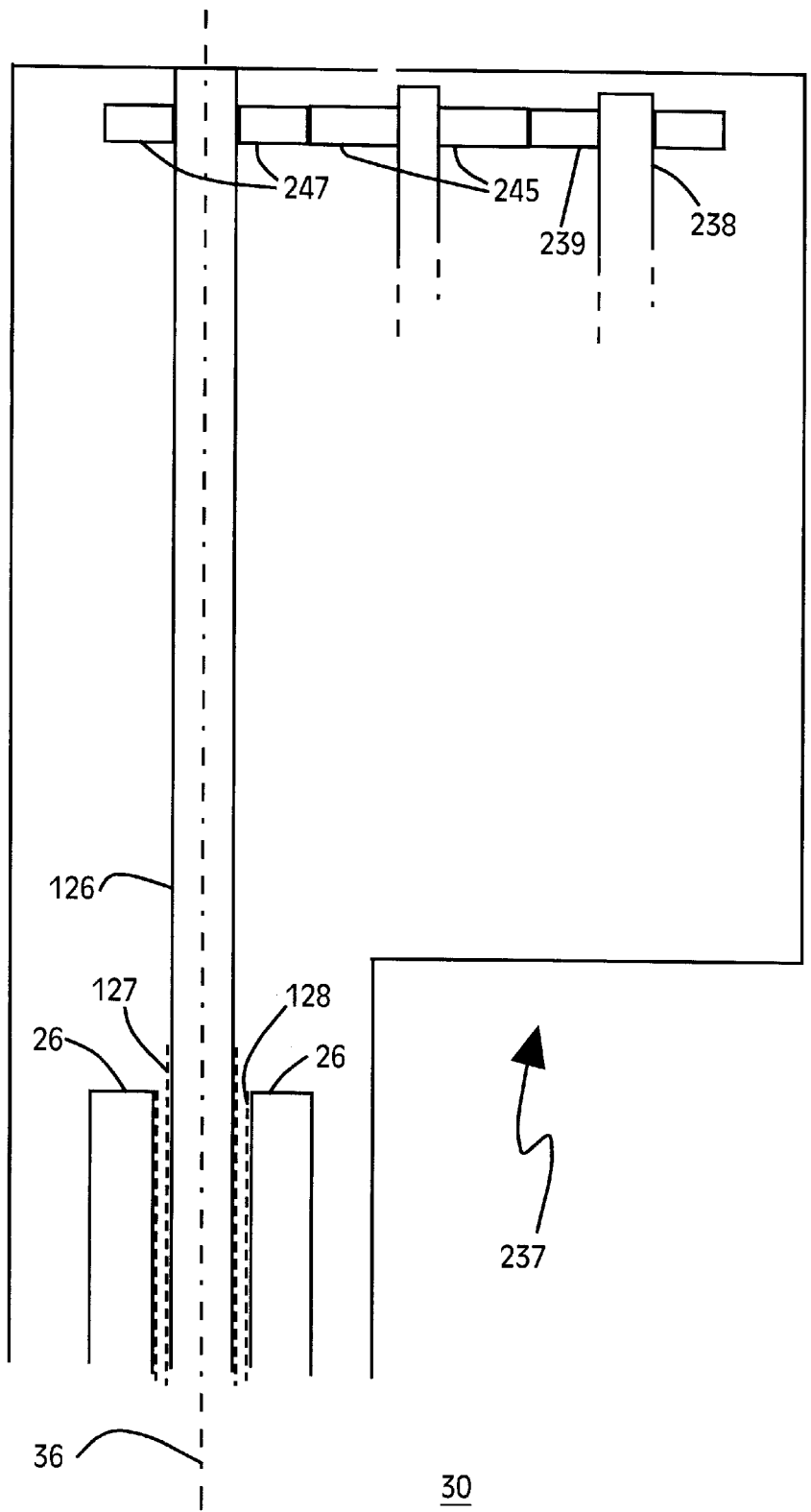
FIG. 15 is an abstract diagram for describing some mechanical linkages in more detail.

FIG. 15 is an abstract, cross-sectional view for describing some mechanical linkages in actuator 30.

Threaded cylinder 26 includes interior threads 128 on the interior of cylinder 26. Screw 126 includes a shaft with exterior threads 127 on the exterior of the shaft. Threads 127 of screw 126 are engaged with the threads 128 of cylinder 26, such that threaded cylinder 26 and screw 126 define a common longitudinal axis 36. Motor 237 is engaged with screw 126 via gears. When motor 237 is on, screw 126 rotates, thereby moving threaded cylinder 26 in a vertical direction.

More specifically, when motor 237 is on, motor shaft 238 rotates, thereby rotating pinion gear 239, thereby rotating transfer gear 245, thereby rotating pinion gear 247 to turn screw 126. Screw 126 remains vertically fixed during this rotation. Because threads 127 are engaged with threads 128, the rotation of screw 126 causes cylinder 26 to change vertical position.

Actuator 30' includes a motor 237' that drives threaded cylinder 26', via screw 126', in a manner similar to that described in connection to actuator 30. A common axis defined by threaded cylinder 26' and screw 126' is horizontally aligned with oil 12 in vessel 10.

It is preferred that actuators 30 and 30' each be hermetically sealed to prevent entry of vapor into their respective screw mechanisms.

It is presently preferred that actuator 30 be model Electrak 1 #9302-448-003, marketed by Warner Electric, South Beloit, Ill. Actuator 30 has a load rating of 25 pounds and a six inch stroke, and is powered by 12 volts DC.

Thus, the preferred conversion method provides a food lifting mechanism that may be integrated with an existing food cooking machine, without major structured modifications to the cooking machine.

Thus, the preferred system and method can independently cook two batches of food, by automatically lifting a respective basket at the expiration of a respective timer for the basket. The system is reliable and easy to maintain.

Although ceilings 205 and 207 act so that less than 2% of F3 is applied against threaded cylinder 26, it is contemplated that a mechanism may allow more of this horizontal force to be applied against a lift member, such as threaded cylinder 26, provided less than 50% of this horizontal forces is applied against the lift member. It is preferred that no more than 15% of this horizontal force be applied against the lift member.

Although back surface 209 of channel 50 act so that less than 2% of the force F2 is applied against threaded cylinder 26, it is contemplated that a mechanism may allow more of this horizontal force to be against the wall to be applied against a lift member, provided that less than 50% of this horizontal force is applied against the lift member. It is preferred than no more than 15% of this horizontal force be applied against the lift member.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims.

What is claimed is:

1. A system for operating with a cooking medium, a holder for a food portion, the holder and the food portion having a combined mass, the combined mass having a center of mass, the combined mass having a weight, the system comprising:

a housing including a vessel for holding the cooking medium;

a threaded member supported by the housing and couplable to the holder, the threaded member defining a longitudinal axis, the longitudinal axis being horizontally aligned with the vessel, the longitudinal axis intersecting a volume occupied by the cooking medium in the vessel, the longitudinal axis being horizontally displaced from the center of mass by at least 0.2 inches per pound of the combined mass; and a motor for changing the vertical position of the threaded member.

2. The system of claim 1 wherein the weight of the combined mass produces a horizontal force, and the system further includes an assembly for applying the horizontal force to the housing, such that no more than 50% of the horizontal force is applied to the threaded member, the assembly being vertically fixed as the motor changes the vertical position of the threaded member.

3. The system of claim 1 wherein the housing defines a wall, a weight of the combined mass produces a first horizontal force toward the wall and a second horizontal force away from the wall, and the system further includes a mechanism for applying the second horizontal force to the housing, such that no more than 50% of the second horizontal force is applied to the threaded member.

4. The system of claim 3 wherein the mechanism includes
a first assembly for receiving most of the second horizontal force;
and a second assembly for receiving most of the first horizontal force.

5. The system of claim 1 wherein the housing defines a wall extending above the vessel, and the system further includes
a plate defining two holes for bolting onto the wall, wherein the threaded member is coupled to the plate.

6. The system of claim 1 further including
a horizontal beam supporting the threaded member.

7. The system of claim 1 wherein the housing defines a wall extending above the vessel, and the system further includes
a horizontal longitudinal member extending horizontally in a direction parallel to the wall; and
a food holder support coupled to the horizontal longitudinal member.

8. The system of claim 1 further including
a manual interface on the housing; and
a signal path coupled between the manual interface and the motor.

9. The system of claim 8, wherein the signal path is supported by the housing.

10. The system of claim 9 further including a plurality of legs for supporting the housing above a floor.

11. An assembly for a system including a housing with a vessel for holding a cooking medium, and a food holder for a food portion, the food holder and the food portion having a combined mass, the combined mass having a center of mass, the combined mass having a weight, the assembly comprising:
a threaded member defining a longitudinal axis;
a motor for changing the vertical position of the threaded member;
a first subassembly for coupling the threaded member to the housing such that the longitudinal axis is horizontally aligned with the vessel and intersects a volume occupied by the cooking medium in the vessel; and
a second subassembly for coupling the threaded member to the food holder such that the longitudinal axis is horizontally displaced from the center of mass by at least 0.2 inches per pound of the combined mass.

12. The assembly of claim 11 wherein a weight of the combined mass produces a horizontal force, and the assembly further includes another member for applying the horizontal force to the housing, such that no more than 50% of the horizontal force is applied to the threaded member, the other member being vertically fixed as the motor changes the vertical position of the threaded member.

13. The assembly of claim 11 wherein the housing further includes a wall extending above the vessel, and the assembly further includes
a plate defining two holes for bolting onto the wall, wherein the threaded member is coupled to the plate.

14. A system for a cooking medium, a holder for a food portion, the holder and the food portion having a combined mass, the combined mass having a center of mass, the system comprising:

a housing including a vessel for holding the cooking medium;
a lift member supported by the housing and engagable with the holder, the lift member defining a longitudinal axis intersecting a volume occupied by the cooking medium in the vessel, the longitudinal axis being horizontally aligned with the vessel, the longitudinal axis being displaced from the center of mass; and
a motor for changing the vertical position of the lift member, wherein a weight of the combined mass produces a first horizontal force, and the system further includes a mechanism for applying the first horizontal force to the housing, such that no more than 50% of the first horizontal force is applied to the lift member.

15. The system of claim 14 wherein the weight of the combined mass produces a second horizontal force having a direction opposite the first horizontal force, wherein the mechanism includes
a first assembly for receiving most of the first horizontal force; and
a second assembly member for receiving most of the second horizontal force.

16. A system for food and a food holder having a combined mass, the combined mass having a center of mass, and a housing with a cooking vessel for holding a cooking medium, the system comprising:
a threaded member defining a longitudinal axis;
a means for coupling the food holder to the threaded member to such that the center of mass is horizontally displaced from the longitudinal axis by at least 0.2 inches per pound of the combined mass; and
a means for raising the threaded member to lift the food holder from the cooking medium, while the longitudinal axis is horizontally aligned with the vessel and intersecting a volume occupied by the cooking medium in the vessel.

17. The system of claim 16 wherein a weight of the combined mass produces a horizontal force, and the system further includes an assembly for
applying the horizontal force to the housing, such that no more than 50% of the horizontal force is applied to the threaded member.

18. The system of claim 16 wherein the housing defines a wall extending above the vessel, and the system further includes
a plate defining two holes for bolting onto the wall, wherein the threaded member is coupled to the plate.

19. The system of claim 16 further including
a horizontal beam supporting the threaded member.

20. The system of claim 16 wherein the housing defines a wall extending above the vessel, and the system further includes
a horizontal longitudinal member extending horizontally in a direction parallel to the wall; and
a food holder support coupled to the horizontal longitudinal member.

21. The system of claim 16 wherein the means for raising includes a motor, and the system further includes
a manual interface on the housing; and a signal path coupled between the manual interface and the motor.

22. The system of claim 21, wherein the signal path is supported by the housing.

23. The system of claim 22 further including a plurality of legs for supporting the housing above a floor.

24. The system of claim 16 wherein the housing defines a wall, a weight of the combined mass produces a first horizontal force toward the wall and a second horizontal force away from the wall, and the system further includes a mechanism for applying the second horizontal force to the housing, such that no more than 50% of the second horizontal force is applied to the threaded member.

\* \* \* \* \*